United States Patent [19]

Press

[11] 4,288,105
[45] Sep. 8, 1981

[54] PIPE UNION WITH BOTH PRE-LOAD DEPENDENT AND INDEPENDENT SEALS

[75] Inventor: Irving D. Press, West Orange, N.J.

[73] Assignee: Resistoflex Corporation, Roseland, N.J.

[21] Appl. No.: 90,037

[22] Filed: Oct. 31, 1979

Related U.S. Application Data

[63] Continuation-in-part of Ser. No. 13,676, Feb. 21, 1979.

[51] Int. Cl.³ .............................................. F16L 9/14
[52] U.S. Cl. ...................................... 285/55; 285/24; 285/93; 285/351; 285/363; 285/368
[58] Field of Search ................ 285/55, 412, 414, 415, 285/368, 363, 405, 351, 229, DIG. 18, 24, 93

[56] References Cited

U.S. PATENT DOCUMENTS

| 773,046 | 10/1904 | Bayles | 285/363 X |
|---|---|---|---|
| 2,352,583 | 6/1944 | Zetterquist | 285/363 X |
| 2,479,104 | 8/1949 | Dreyer | 285/368 X |
| 2,739,828 | 3/1956 | Schindler et al. | 285/363 X |
| 3,204,989 | 9/1965 | Wilson | 285/363 X |
| 3,253,841 | 5/1966 | Ahmud | 285/55 |
| 3,284,107 | 11/1966 | West | 285/363 X |
| 3,552,776 | 1/1971 | Leymann | 285/229 X |
| 3,603,616 | 9/1971 | Smith | 285/363 X |
| 4,127,287 | 11/1978 | Davies | 285/DIG. 18 |

FOREIGN PATENT DOCUMENTS

| 1650064 | 8/1970 | Fed. Rep. of Germany | 285/363 |
|---|---|---|---|
| 160239 | 5/1933 | Switzerland | 285/363 |
| 373934 | 1/1964 | Switzerland | |
| 237495 | 11/1969 | U.S.S.R. | 825/363 |

OTHER PUBLICATIONS

*Toxicology and Process Design* Walter R. Payne, Chemical Engineering, Apr. 24, 1978, pp. 83–85.

*Primary Examiner*—Dave W. Arola
*Attorney, Agent, or Firm*—Hopgood, Calimafde, Kalil, Blaustein & Judlowe

[57] ABSTRACT

A disconnectable union for fluid piping is provided in which a pre-load dependent first seal between disassemblable union members is coaxially related to a second seal operable independently of the pre-loading of the first seal such that the second seal independently contains any fluid that comes in contact with it even if such fluid contact is due to diminution of the pre-loading of the first seal. Various flange joint configurations and seal constructions are disclosed for both plastic lined and unlined metal pipe.

26 Claims, 15 Drawing Figures

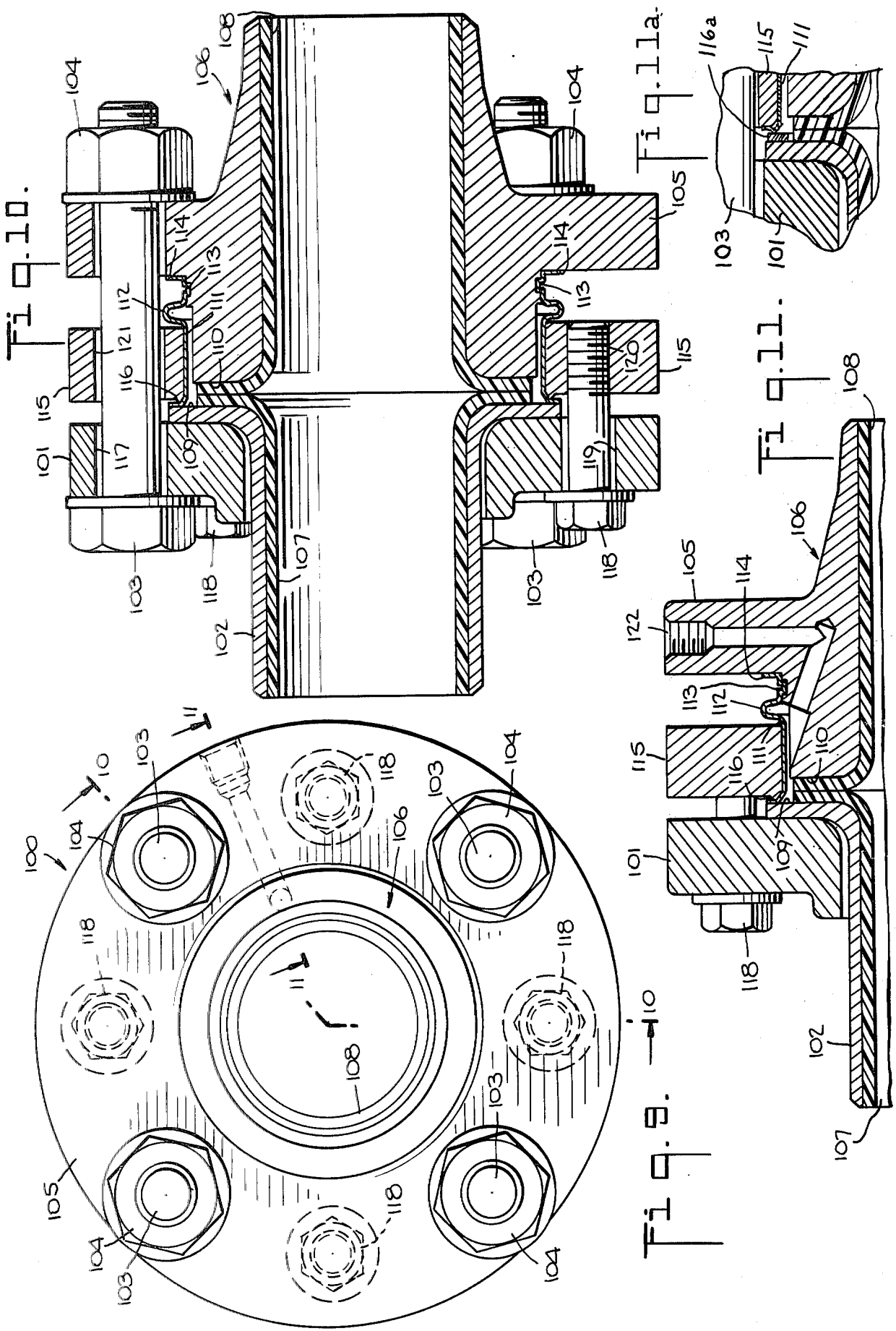

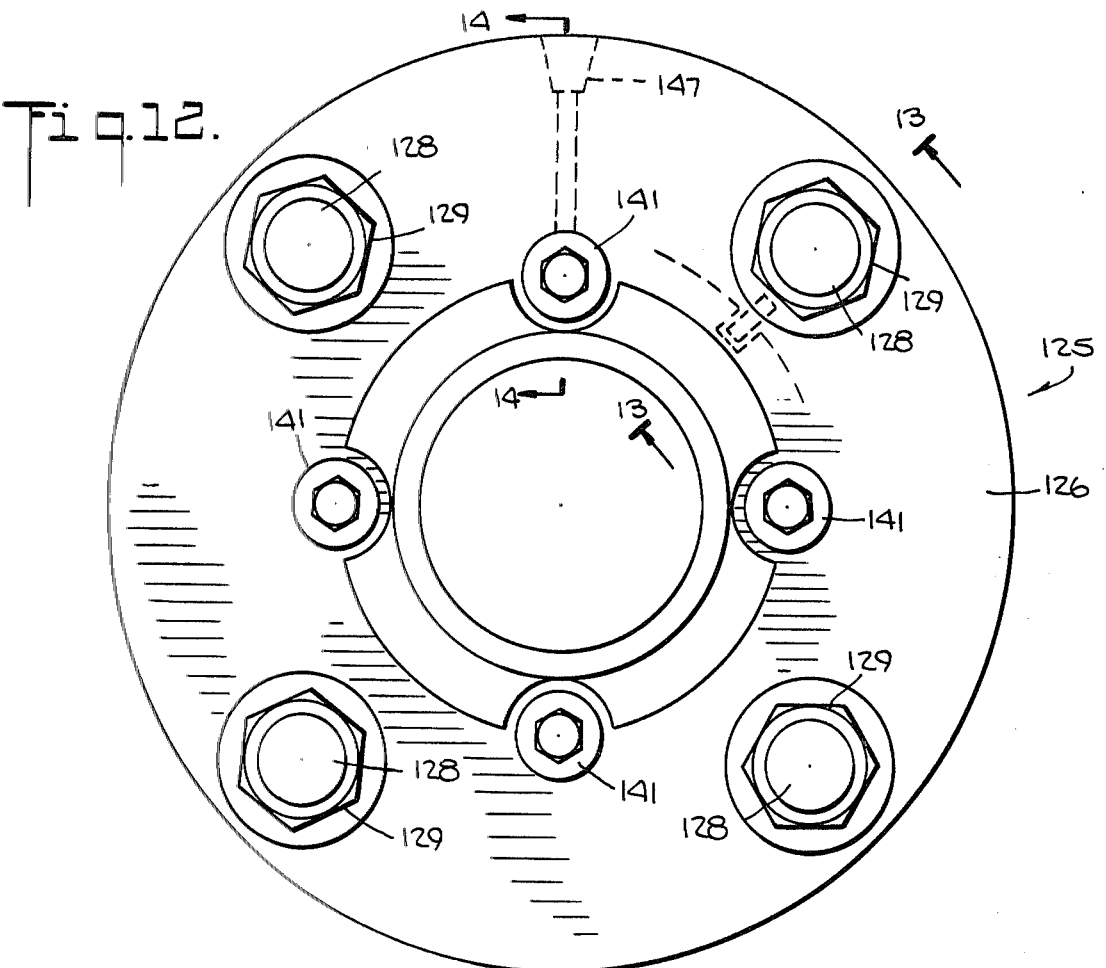
Fig. 12.
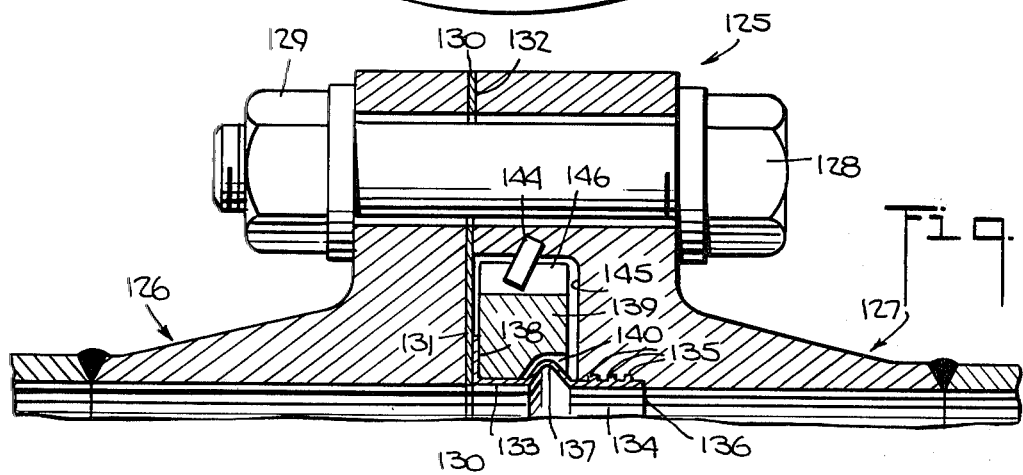
Fig. 13.
Fig. 14.

PIPE UNION WITH BOTH PRE-LOAD DEPENDENT AND INDEPENDENT SEALS

This application is a continuation-in-part of application Ser. No. 013,676, filed Feb. 21, 1979.

BACKGROUND OF THE INVENTION

The present invention relates to disconnectable unions for fluid piping and more particularly to an arrangement for establishing a superior leak resistant joint between piping components.

In 1976, the piping code document ANSI B31.3-1976 entitled "Chemical Plant and Petroleum Refinery Piping" was revised to reflect growing concern with the conveyance of hazardous and toxic fluids. It includes a service category designated "Category M" which is defined as "a toxic fluid service in which exposure to very small quantities in the environment can produce serious irreversible harm to persons on breathing or bodily contact, even when prompt restorative measures are taken." The specifications promulgated for meeting such service requirements are among the most stringent ever devised and operate on the theory that acceptable piping should be essentially leakproof.

In the absolute sense, nothing is leakproof since everything is affected by the passage of time. Therefore, one approach has been to provide concentric containment structures with provision to detect failure of the inner structure before the outer structure is induced to fail. For example, it is asserted in an article entitled "Toxicology and Process Design" by Walter R. Payne, *Chemical Engineering* Apr. 24, 1978, pp. 83 to 85, that "piping should be joined by welding if possible; in other cases, the flanges or couplings should carry shields or guards to prevent the possibility of a splash if the joint fails. For every toxic or otherwise hazardous material, the designer should consider a concentric-pipe system, so that failure of the chemical carrying inner pipe can be quickly recognized." An illustration of a concentric-pipe joint appears in said article wherein a bolted flange joint interconnects the ends of two pipe components. The seal between the flanges appears to be a conventional gasket while the entire joint is shrouded in a protective shield, the assumption being that the joint may fail. In fact, flange joints have always been the weak link in any piping system.

In Swiss Pat. No. 373,934 issued Jan. 31, 1964 there is disclosed a sealing arrangement for a flanged pipe joint wherein the seal consists of a hard metal ring coated with a layer of softer metal such as silver and provided with a plurality of concentric circular grooves formed in its face, providing the structure with plural sealing zones, whereby leakage past one zone into a groove can be detected. In one embodiment protection against leaks in the seal is further increased by welding together and to the flange faces a pair of short tubular elements referred to as tabs or tongues which in essence encloses the seal within a rigid pipe and converts the joint from one that is disconnectable or temporary to one that is permanent.

Direct welding of pipe, while avoiding certain weaknesses of a flange joint, has its own limitations not the least of which is cost of producing a welded joint and its incompatibility with the concept of disconnectability; hence, often a preference for flange joints. However, flange joints, as presently known, are subject to failure for various reasons, most of which involve loss of sealing integrity. The sealing integrity of a standard flange joint is affected adversely by: improper installation, i.e., use of wrong bolts, wrong torque, etc.; bolt fracture due to over-torque; bolt corrosion, and metal creep in the bolts. Misalignment of piping during installation is a major cause of overstressed bolts. Other adverse factors are: gasket cold flow; gasket deterioration with age; gasket shrinkage due to low temperature; gasket deformation under heat cycling; gasket degradation by conveyed fluids; pipe bending loads and tensile loads; vibration; shock loads and water hammer; and proximity to external overheat conditions. Of course, the joints are also subject to failure upon the occurrence of fire, flood, earthquake or other catastrophic conditions.

In the discussion that follows two distinctly different types of fluid seals will be mentioned. Certain seals are established by bringing together confronting surfaces of the pipe joint components or union members either directly or with a gasket type sealing member interposed therebetween. In either case the effectiveness of the seal that is established depends upon the forces with which the parts are brought together and ultimately on the pre-loading developed between the sealing surfaces or within the seal member itself. In a flange joint, for example, with a simple gasket sandwiched between the flanges, the pre-loading of the gasket, and the effectiveness of the fluid seal, will depend initially on the torque developed in the flange bolts. Because of pipe misalignment the individual flange bolts are often subjected to unequal stress. Once installed, however, the pre-loading will experience diminution upon the occurrence of any one or more of the following phenomena: metal creep in the bolts, gasket cold flow, gasket deterioration with age, gasket shrinkage due to low temperaure (assuming the absence of compensating bolt shrinkage), gasket deformation under heat cycling and gasket degradation by conveyed fluid. Pipe bending loads and tensile load can also cause reduction in seal pre-loading but this may not be uniform circumferentially throughout the seal. The foregoing enumeration should not be considered as exhaustive of the possibilities but merely exemplary for the purpose of conveying the meaning to be attached to the expression "pre-loading" as used herein. Another way of looking at it is to consider the seals as being gap sensitive, i.e., sensitive to the gap between the union members that are being sealed.

Contrasted with the above are seals of the type that are not readily categorized but which are in essence not gap sensitive. The nature of these latter seals will appear from the detailed description of the invention.

With the foregoing in mind, it is an object of the present invention to provide a pipe union which has concentric piping integrity, retains the disconnectability of standard union joints, can be assembled quickly and economically, and affords reliable safety without the need for bulky surrounding protective shields as well as continuity of operation which shields cannot provide.

SUMMARY OF THE INVENTION

In accordance with the present invention there is provided a disconnectable pipe union comprising in combination first and second union members, means for establishing between said union members a first circumferential seal whose sealing effectiveness is a function of its pre-loading and which is fluid-tight when pre-loaded above a given level, means constructed and arranged to be placed under tension to draw said first and second union members toward each other to provide at least at the time the pipe union is assembled at least said given level of pre-loading for said first seal, said union members being related to said means for establishing a first seal such that confronting circumferential portions of said union members radially displaced from the region of said first seal remain separated axially with at least a certain minimum gap therebetween when the union members are drawn together with said first seal established therebetween, and axially extensible sealing means constructed and arranged for establishing a second fluid-tight circumferential seal bridging said gap and operative independently of said pre-loading, said axially extensible sealing means being separably fastened to at least one of said union members.

BRIEF DESCRIPTION OF THE DRAWINGS

The invention will be better understood after reading the following detailed description of the presently preferred embodiments thereof with reference to the appended drawings in which:

FIG. 9 is an end elevational view of a still further embodiment of the invention wherein the axially extensible sealing means is permanently fastened to one of the union members and detachably fastened to the other union member;

FIG. 10 is a longitudinal sectional view taken along line 10—10 in FIG. 9;

FIG. 11 is a fragmentary longitudinal sectional view taken along line 11—11 in FIG. 9 to show details of the leak detection ports;

FIG. 11a is a fragmentary view showing a modification of the embodiment of FIGS. 9 to 11 wherein a gasket is interposed between the extensible sealing means and the union member to which it is detachably fastened;

FIG. 12 is an end elevational view of another embodiment of the invention of the general type illustrated in FIG. 9 but with the axially extensible sealing means located radially inwardly of the pre-load dependent seal area;

FIG. 13 is a longitudinal sectional view taken along line 13—13 in FIG. 12; and

FIG. 14 is a longitudinal sectional view taken along line 14—14 in FIG. 12.

The same reference numerals are used throughout the drawings to designate the same or similar parts.

DESCRIPTION OF THE PREFERRED EMBODIMENTS

Figure 1:
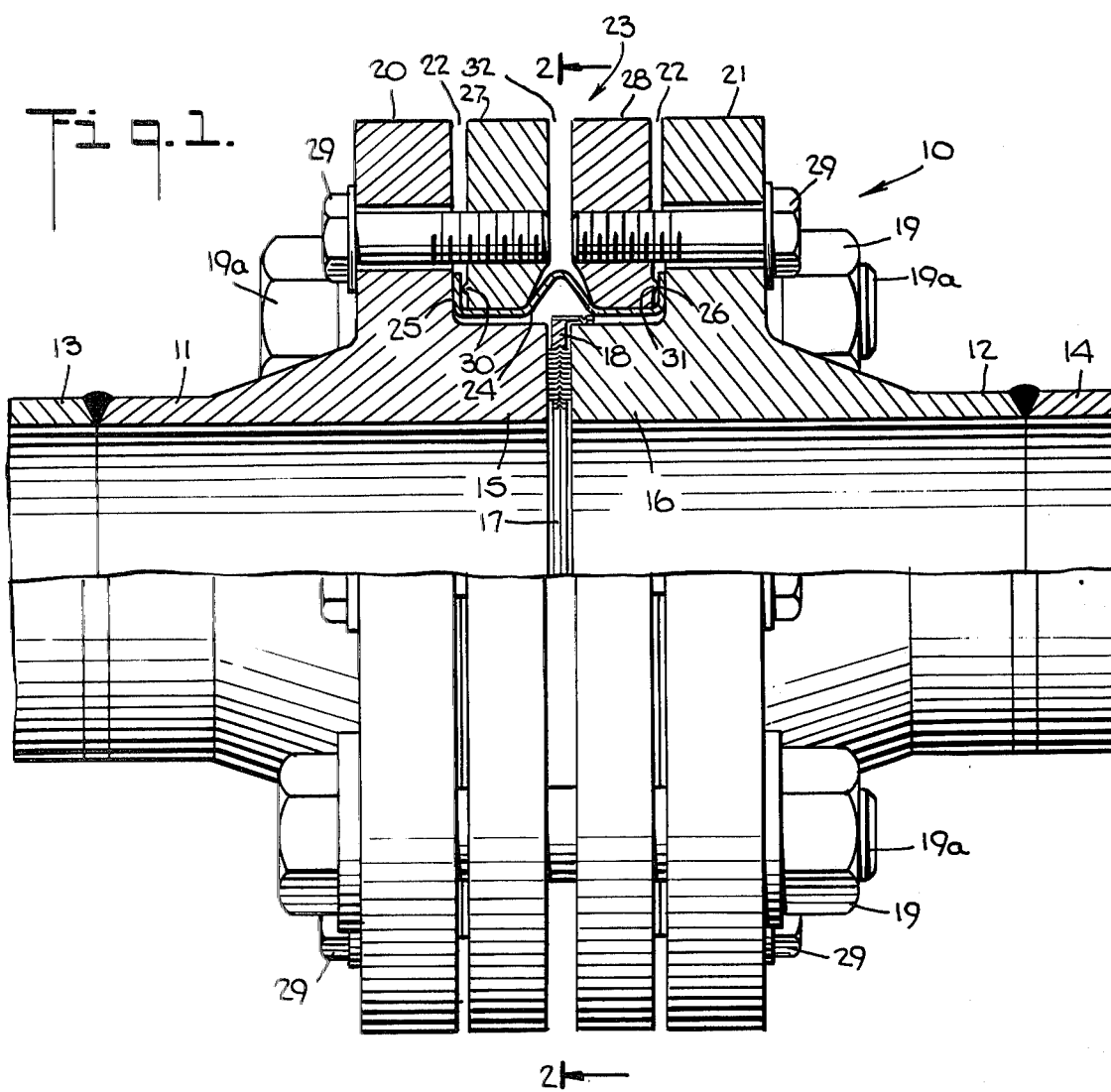
FIG. 1 is a side elevational view in quarter section of a flange type joint in accordance with the present invention wherein the pipe ends must be separated axially for installation of the second seal.

Referring to FIGS. 1 to 4 of the drawings, there is illustrated therein a pipe union 10 consisting of welding neck flanges 11 and 12 shown joined by welding to the ends of the pipe sections 13 and 14, respectively. In this embodiment the flanges 11 and 12 have raised faces 15 and 16 between which is disposed a first seal 17. The seal 17 is shown, by way of example, as one which is made by winding metal and asbestos strip into a spiral pancake. Such seal is well known and is axially compressible to a limited extent with axial compression of the seal being limited by the solid metal annulus 18 which functions as a limiting stop between the raised faces 15 and 16 of the flanges or union member 11 and 12. Compression of seal 17 by squeezing it between raised faces 15 and 16 serves to pre-load the seal and such pre-loading to a given level is necessary to establish a fluid-tight relationship. Conventional nuts and bolts 19 and 19a, here four in number, provide reusable means arranged to be placed under tension between the flange portions of the union members 11 and 12 to draw the same toward each other for providing said given level of pre-loading for seal 17.

Figure 2:
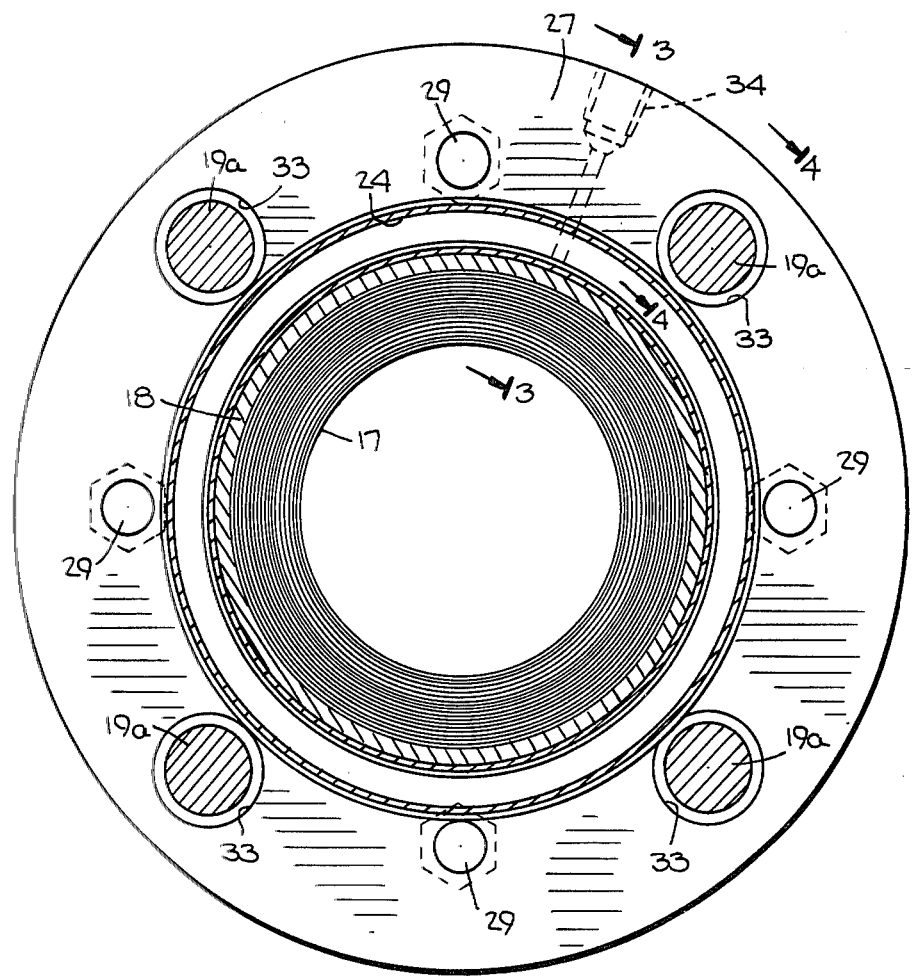
FIG. 2 is a transverse sectional view taken along line 2—2 in FIG. 1.

The union members 11 and 12 are related to the preload dependent or gap sensitive seal 17 such that the radial flanges 20 and 21 thereon, radially outward of the seal 17, remain separated axially with at least a certain minimum gap 22 therebetween when the union members 11 and 12 are drawn together with the seal 17 therebetween. A second annular seal designated generally by the reference numeral 23 is disposed in gap 22 between the radial flanges 20 and 21 of the union members 11 and 12 so as to surround concentrically the first seal 17. The second seal 23 functions independently of the pre-loading on seal 17 and is, within its physical limits, insensitive to the magnitude of gap 22. It consists of a fluid impervious metal element having a tubular portion 24 extending between radially outwardly extending end flange portions 25 and 26 with the tubular portion 24 constructed and arranged, in this instance with a single annular corrugation, for both contraction and extension axially relative to the axial dimension of the seal 17. Annular substantially rigid clamp rings 27 and 28 surround the tubular portion 24 of the seal 23 adjacent each of said flange portions 25 and 26 and are secured by threaded members or bolts 29 to the corresponding radial flanges 20 and 21 of the union members 11 and 12, respectively. In this example four bolts 29 are employed to secure each of the clamp rings 27 or 28 to the respective union flange. As best seen in FIG. 2, the bolts 29 are located circumferentially spaced equidistantly from each other and from the main bolts 19a. Depending upon the pipe size and pressure rating the number of bolts fastening the clamp rings may be varied in number and so may the number of primary bolts 19a joining the union members together.

As seen in FIG. 1, the clamp ring 27, provided with at least one load concentrating circular rib, e.g., rib 30, clamps the end flange 25 of the seal 23 against the face of radial flange 20 to establish a fluid-tight seal therebetween. Alternatively, the rib or ribs can be located on the flange 20 to engage the opposite surface of the flange 25. In similar manner, the ring 28 establishes a seal by urging the rib or ribs on its face, e.g., rib 31, against end flange 26 of seal 23 to clamp it against radial flange 21. It should be observed that a small gap 32 is provided between the clamp rings 27 and 28 such that the seal 23 is capable of axial contraction in order not to interfere with the make-up of the joint between flanges 11 and 12. However, if bolts 19a should yield during service of the pipe joint due to metal creep, fatigue or other reason, such extension of the main bolts 19a, while permitting separation axially or canting of the flange members 11 and 12, will have no detrimental effect upon the seal established independently by second seal 23 between radial flanges 20 and 21. The second seal 23 will merely extend axially maintaining a containment seal around the first seal 17 even though pre-loading of seal 17 should deteriorate anywhere around its circumference to the point of leakage.

Figure 4:
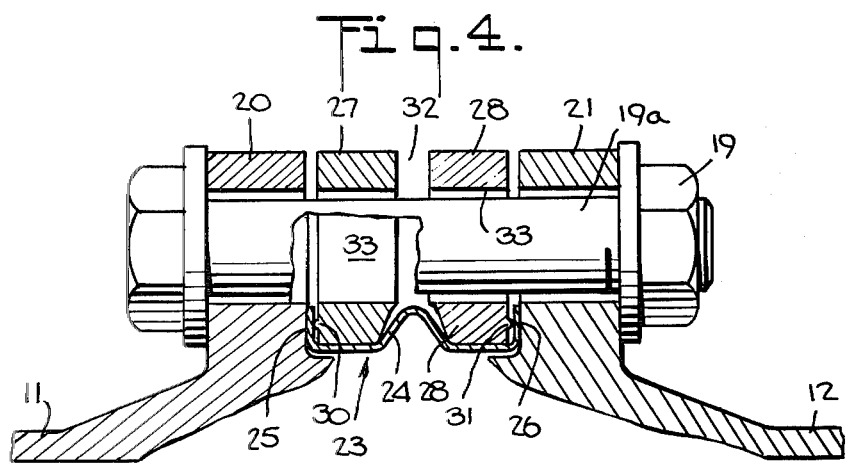
FIG. 4 is a view similar to FIG. 3 but taken along line 4—4 in FIG. 2 to show details of the main flange bolt.

In order to accommodate the main bolts 19a, a series of apertures 33 are provided in the clamp rings. This is best seen in FIGS. 2 and 4.

Figure 3:
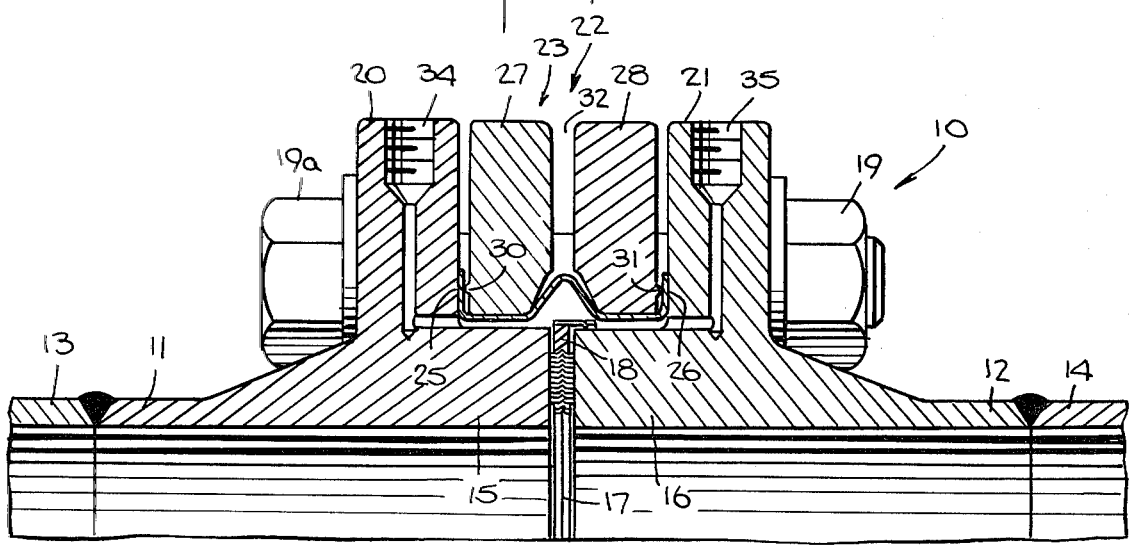
FIG. 3 is a longitudinal sectional view taken along line 3—3 in FIG. 2 to show details of the leak detection ports.

As best seen in FIG. 3, each of the radial flanges 20 and 21 is provided with a leak detection port 34 and 35, respectively, communicating with the space within the gap 22 between the raised faces 15 and 16 and the second or outer seal 23. Consequently, any fluid leaking past the inner pre-load dependent seal 17 can be detected by suitable gauges or detecting devices connected to one or both of the ports 34 and 35.

It should now be apparent that the clamp rings 27 and 28 with bolts 29 provide means for establishing a fluid-tight selectively separable connection between each of the union members 11 and 12 and the corresponding adjacent end 25 and 26 of the seal 23. The last mentioned means is operative independently of the main bolts or reusable means 19 and 19a. Also, as mentioned above, the seal 23 is axially contractible between its end flanges 25 and 26 to an extent sufficient to avoid interfering with the ability of the union members 11 and 12 to be drawn together for developing fluid-tight interengagement with and pre-loading of inner seal 17. It should also be apparent that the clamp rings 27 and 28 are each provided with a circumferential array of spaced threaded apertures whose axes are parallel to the longitudinal axis of the ring and that the radial pipe flanges 20 and 21 are provided with an array of apertures which register with the threaded apertures in said rings when the latter are in place relative to the pipe flanges. Thus, the bolts 29 pass through the apertures in the pipe flanges 20 and 21 into threaded engagement with the corresponding threaded apertures in the clamp rings 27 and 28.

At present, it is preferred to fabricate the radially outer sealing component which functions independently of any preloading of the inner seal and which consists of portions 24, 25 and 26, from "dead soft" stainless steel, e.g., type 316L. Alternatively, use may be made of any metal which is suitably resistant and flexible for the intended service.

Figure 5:
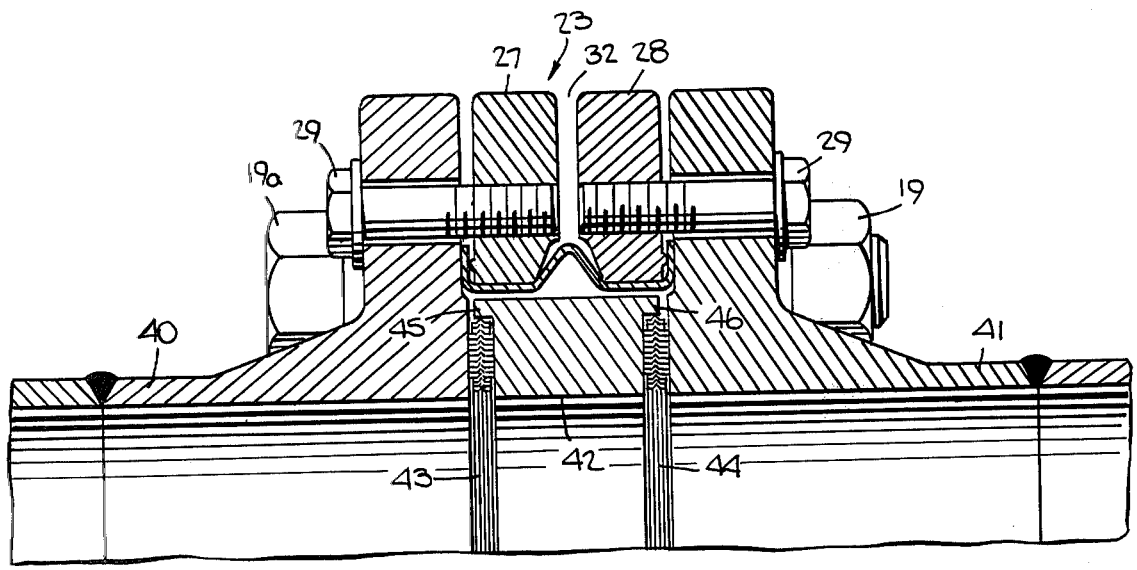
FIG. 5 is a view similar to the quarter sectioned portion of FIG. 1 but showing a modification of the invention wherein both seals can be slipped between the flanges without additional axial separation of the pipe ends.

The embodiment thus described with reference to FIGS. 1 to 4 require the pipes 13 and 14 to be separated axially sufficiently to permit placement of the outer seal 23 around the raised faces 15 and 16, i.e., it is a non-flush installation. However, where the pipes to be joined are located or mounted in such fashion that they cannot be separated axially, a modified union such as shown in FIG. 5 may be employed. As shown therein the seal 23 may be identical to that employed in the embodiment of FIG. 1. However, the raised faces on the flange members 40 and 41 have been reduced to minimum height (alternatively, the raised faces may be eliminated altogether) and an annular spacer 42 has been provided with separate seals 43 and 44 located between the spacer 42 and the corresponding flange 40 and 41. The shoulders 45 and 46 on the spacer 42 function to determine the maximum compression or pre-loading on the seals 43 and 44 when the bolts 19a draw the flanges 40 and 41 together. It should be apparent that the spacer 42 with seals 43 and 44 located concentrically within the outer seal 23 can be slid into place within the gap between the flanges 40 and 41 without appreciable axial separation therebetween. This installation is often categorized as being of the flush type. The spacer 42 with seals 43 and 44 may be considered as the gap sensitive sealing means.

Figure 6:
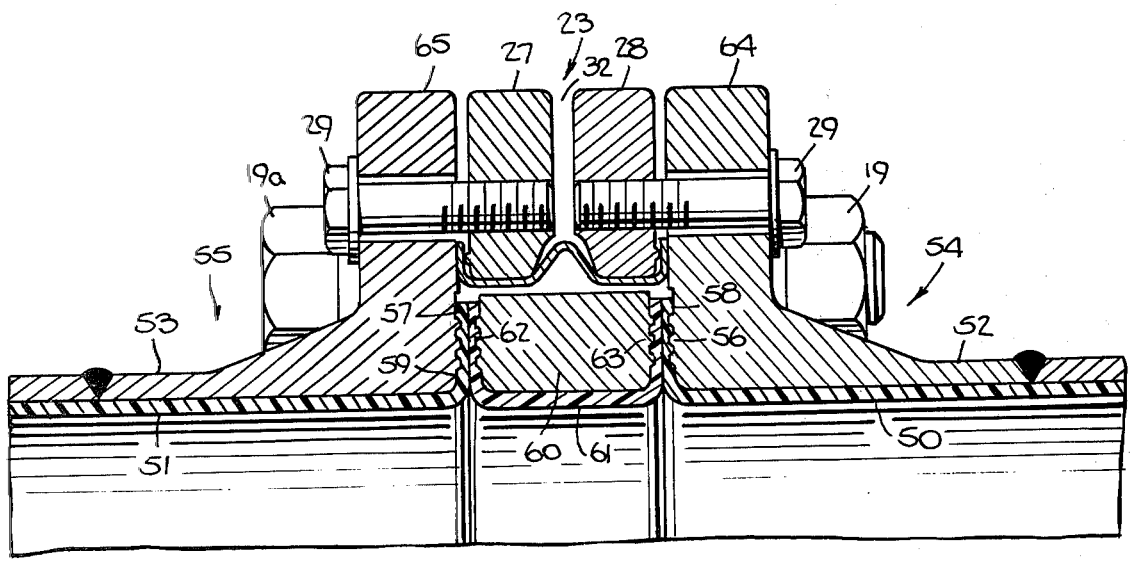
FIG. 6 is a view similar to FIG. 5 but showing a further modification wherein the pipes are lined with plastic and the radially inner pre-load dependent seal is jacketed with plastic.

In FIG. 6, there is illustrated a further embodiment of the present invention wherein the pipe is of metal, preferably steel, lined with plastic such as polytetrafluoroethylene (PTFE). In such case the plastic linings 50 and 51 are carried through the welding necks 52 and 53, respectively, of the welding neck flanges 54 and 55. The radially inner pre-load dependent seal includes annular spacer 60 of metal which is lined with plastic 61 flared radially outwardly over its opposing faces 62 and 63. Where plastic material is to be clamped between opposing harder surfaces it is preferable to provide one or more annular ribs and/or grooves which function to trap the plastic material and prevent its extrusion under load in view of the inherent cold flow properties of plastics in general. At the same time annular ribs can be used to increase the unit loading and improve the seal. Such ribs and/or grooves may be provided as desired on surfaces 58 and 59 and on faces 62 and 63 and are included in FIG. 6 by way of example.

The outer gap insensitive seal 23 may be the same as that previously described with reference to FIG. 1, and so may the flange portions 64 and 65, the bolts 19a, and the bolts 29. The pipe flanges may also be provided with leakage monitoring ports as previously described. Operation of the union shown in FIG. 6 is essentially the same as that shown in the preceding figures.

Figure 7:
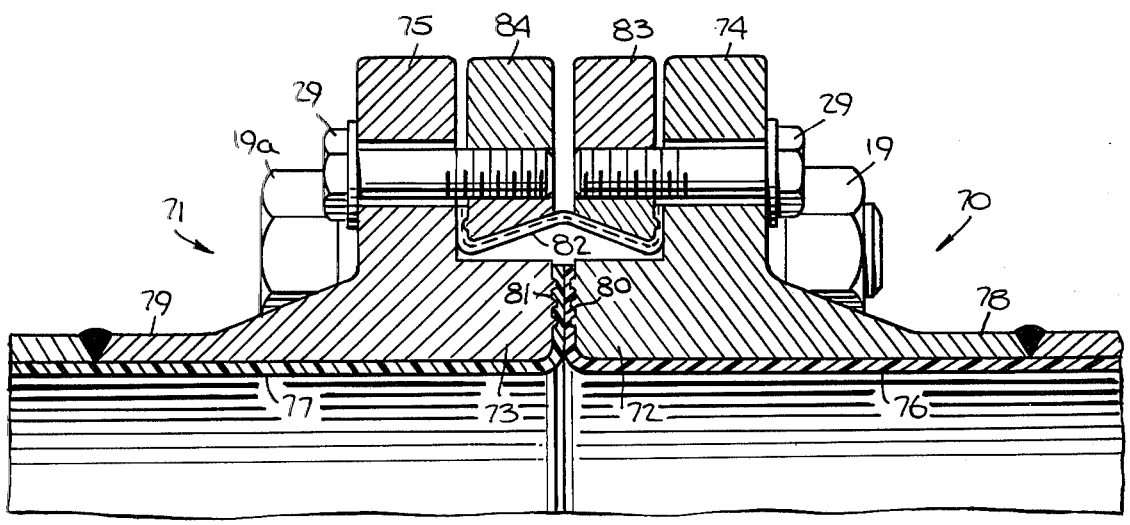
FIG. 7 is a view similar to the quarter-sectioned portion of FIG. 1 but showing a further modification of the invention wherein the pipes are lined with plastic but the configuration is such as to require axial separation of the pipe ends to install the radially outer gap insensitive seal.

The embodiment disclosed in FIG. 6 is useful where lined pipe is installed under such circumstances that the pipes cannot be separated axially for the purpose of installing the seals. Where such separation is tolerable a less expensive joint may be provided as shown in FIG. 7. The similarity to the embodiment shown in FIG. 1 should be apparent. As seen in FIG. 7, the welding neck flanges 70 and 71 are provided, respectively, with raised faces 72 and 73, and radial flanges 74 and 75. The plastic pipe linings 76 and 77 are brought through the neck portions 78 and 79 of the flanges 70 and 71 where they are flared radially outwardly at 80 and 81 over the surfaces of the raised faces 72 and 73, which surfaces may be provided with ribs and/or grooves as described above with reference to FIG. 6, e.g., as shown in FIG. 7. Thus, the flared ends 80 and 81 of the pipe linings 76 and 77 also function as the pre-load dependent first seal between the flange members 70 and 71 when the latter are drawn together by bolts 19a.

While the second or outer seal illustrated and described with reference to the preceding figures had a metal element consisting of portions 24, 25 and 26, it is also possible to employ a plastic element as shown in the embodiment of FIG. 7. The plastic element 82 is provided with clamp rings 83 and 84 in a manner similar to that employed in seal 23. However, it will be observed that the radially inner annular surface of the clamp rings 83 and 84 is configured somewhat differently so as not to permit or accommodate as deep a corrugation in the sealing member 82 as was accommodated in the seal 23. In a preferred embodiment of the subject invention, the seal element 82 may be formed from sintered PTFE material similar to the linings 76 and 77 of the pipes. As shown, the faces of the rings 83 and 84 may be provided with at least one annular rib and/or groove for entrapping the flared or flanged end of the plastic element 82. In other respects, the joint shown in FIG. 7 is simlar to the joint previously described. It should be understood that the seal element 82 of plastic could be substituted if desired for the metal seal 24 in FIG. 6, for example.

Figure 8:
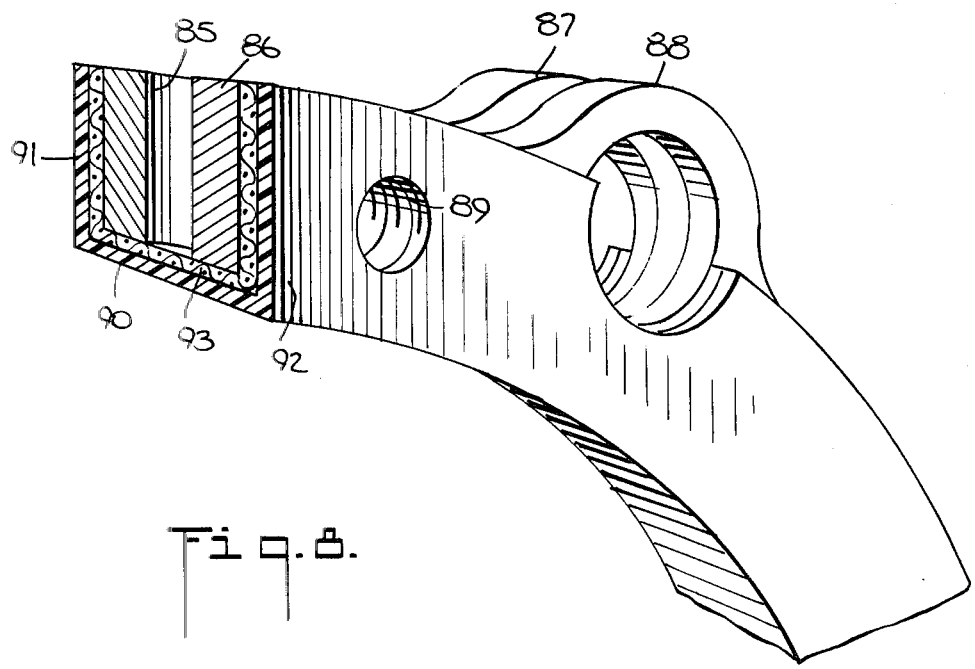
FIG. 8 is a fragmentary perspective view of a further embodiment of the gap insensitive seal.

The gap insensitive seal may be modified further in a manner such as that shown by way of example in FIG. 8 to which attention should now be directed. The seal shown therein consists of clamp rings 85 and 86 containing generally reduced outside diameters combined with radial enlargements or tabs 87 and 88, which have been apertured to accommodate the flange bolts, and threaded bores such as the one shown at 89 so as to cooperate with the flange members of the joints in the same manner as the outer seals described previously. The fluid sealing portion of the seal shown in FIG. 8 is provided by a sintered PTFE element having a tubular central portion 90 and radially extending end flange portions 91 and 92. In addition, the plastic is reinforced by the interposition of PTFE impregnated glass fabric 93 between the clamp rings 85 and 86 on the one hand and the PTFE element of the seal. Whether or not the plastic impregnated fabric layer 93 is provided depends upon the dimensioning of the seal and the fluid pressure it is intended to contain. Under most circumstances, the plastic portion 90, particularly when formed from sintered PTFE resin, will be found to have sufficient strength to bridge a short gap between the clamp rings 85 and 86 without the need for the glass fabric reinforcement 93. It will be understood that the plastic provides inherently for some degree of elongation and contraction similar to the other seals described above. The reason for tabs 87 and 88 is to enable the clamp rings 85 and 86 to be lightened between the tabs by reducing the outside diameter without reducing their rigidity to a point where they are liable to buckle under the bolting stresses and fail to maintain a proper fluid-tight seal against the corresponding pipe flange. It should be understood that the section of the seal shown in FIG. 8 is typical and that apertured tabs similar to tabs 87 and 88 and threaded bores similar to bore 89 are spaced circumferentially around the seal.

All of the pipe unions that have been described with reference to FIGS. 1 to 8, inclusive, have in common the use of an axially extensible or gap insensitive seal that is disconnectably joined to each of the union members. However, it is possible to achieve substantially the same functional advantages with a modified construction which is considerably simplified, weighs and costs less, and requires substantially less assembly time to install. All of this is accomplished with the elimination of two sealing locations, with one less clamp ring, one less circle of clamping bolts and without a spacer ring. An example of such modified construction is illustrated in FIGS. 9 to 11 to which attention is now invited.

The reference numeral 100 designates, generally, the pipe union which includes a lap joint flange 101 mounted on a lap joint stub end 102, which flange is joined, when the union 100 is assembled, by main bolts 103 and nuts 104 to the radial flange portion 105 of a welding neck flange 106. In the illustrated embodiment the stub end 102 and flange 106 are assumed to be joined by welding to respective sections of metal pipe lined with plastic (not shown). The plastic linings, designated 107 and 108, extend beyond the ends of the respective pipe sections through the corresponding flange whereupon they are flared, respectively, radially outwardly over the face 109 of the stub end 102 and over the raised face 110 of the flange 106. When the joint or union is assembled the flared linings are brought into engagement as shown, are compressed between the stub end face 109 and the raised face 110, and provide the preload dependent or gap sensitive seal. If the union is applied to unlined pipe, a gasket such as the seal 17 of FIG. 1, or the seal to be described below with reference to FIGS. 12 to 14, could be interposed between faced 109 and 110 to provide the gap sensitive seal.

An axially extensible containment seal is provided by the tubular metal element 111 formed with a circumferential corrugation or arch 112. The element 111 is dimensioned to telescope loosely over the raised face 110 of flange 106 and to be permanently secured at one end to the latter by rolling or swaging an annular portion into a groove 113 for resisting axial separation and by welding the edge at 114 for perfecting a fluid-tight seal. The opposite end of element 111 passes through a substantially rigid metal clamp ring 115 and is flared radially outwardly over a load concentrating circular rib 116. As seen in FIG. 10 the lapped end 109 of the stub end 102 extends radially out to the bolt circle stopping almost tangent to the bolt holes 117 for the main bolts 103. In standard lap flange construction the lapped end terminates a substantial distance inward of the bolt circle such as at a diameter equal to the outside diameter of the raised face 110 of flange 106.

When assembling the union of FIGS. 9 to 11 the main bolts 103 are first tightened to specified torque levels whereupon the clamp ring 115 is fastened to flange 101 by four circumferentially spaced bolts 118 passing through apertures 119 in flange 101 into threaded bores 120 in clamp ring 115. The bolts 118 are tightened to enable the clamp ring 115 to develop a fluid-tight seal between the flared end of element 111 and the face 109 of stub end 102. As shown, the bolts 118 are located circumferentially intermediate the main bolts 103 and the clamp ring 115 is provided with suitable apertures 121 to permit passage of the main bolts 103.

As with the previously described embodiments, a leak detecting port 122 may be provided as shown in FIG. 11. Also, the axially extensible element 111 may be formed from the same materials mentioned above as useful in fabricating element 24, 25 and 26.

While a lap joint flange 101 has been illustrated in FIGS. 9 to 11, it should be evident that other flange types are usable instead.

When the union illustrated in FIGS. 9 to 11 is used, as shown, with plastic lined metal pipe, the main bolts may be torqued to about 25 to 40 foot pounds each. The lesser torque has been found sufficient for a 2 inch pipe while the greater torque has been employed for a 3 inch pipe to establish a seal between the flared ends of the liner when the liner is formed from sintered PTFE that is rated to handle up to 150 psi fluid pressure. If the seal between the liner ends should leak for any reason the metal element 111 will easily contain up to 150 psi of fluid pressure until appropriate repairs can be made.

In the embodiment to be described below with reference to FIGS. 12 to 14, a reinforced graphite gasket is interposed between the flared end of the extensible element and the adjacent union member. Similarly, such gasket may be interposed advantageously in the embodiments described above between the flared or flanged ends of the extensible elements and the surfaces of the union members to which they are clamped. The gasket 116a in FIG. 11a is typical.

When an unlined pipe line is employed to handle fluids at high temperatures such as might be encountered in a petroleum refinery, say, in excess of 1000° F., conventional flange unions in such line experience leakage problems when the line has been operated at such high temperatures, cooled down to ambient temperature during a shut down, and thereafter placed in service. The conventional joints tend to leak until they reattain the elevated temperature. Such problem results from seal compression and metal dimensional changes due to thermal expansion which dimensional changes are not fully recovered when the parts cool to ambient temperature. Less than sealing compression is developed on the seals until the high temperature condition is reached once more. This leakage problem is avoided with the union illustrated in FIGS. 12 to 14 to which attention is now directed.

Comparing FIG. 14 with FIG. 10 it will be observed that the axially extensible element is now located near the inside diameter of the union members and the gap sensitive seal is located radially outwardly thereof. The union 125 includes a welding neck flange 126 which is joined to another welding neck flange, 127, by main bolts 128 and nuts 129. A flat gasket 130 is interposed between the flat face 131 of flange 126 and the radially outboard raised face 132 of flange 127. Gasket 130 should be able to perform under high temperature service and perform under conventional bolt torque conditions which for a 2 inch or 2½ inch pipe might be about 120 foot pounds per bolt. Satisfactory results have been obtained with a gasket formed from graphite in which is embedded metal mesh reinforcement. Similar materials may be substituted if desired. Such reinforced graphite gaskets may be substituted for the seals 17, 43 and 44, if desired.

The extensible seal is provided by metal element 133 having one end, 134, mechanically interlocked by expanding into annular grooves 135 formed on the inside of flange 127. A seal weld is provided at 136. Flexibility is furnished by annular corrugation 137 and the opposite end is radially outwardly flared at 138 over the face of the substantially rigid metal clamp ring 139. The latter is relieved at 140 to accommodate the corrugation 137. The clamp ring 139 is joined to flange 126 with bolts 141 passing through apertures 142 into threaded bores 143. The gasket material 130 may extend over the entire face 131 of flange 126 to facilitate establishing a fluid-tight seal between face 131 and the flared end 138 of seal element 133. To aid in assembling of the joint, a guide pin 144 is mounted within the counterbore 145 in flange 127 for cooperation with an axially oriented slot 146 in the outer periphery of clamp ring 139. This is best seen in FIG. 13. When slot 146 is aligned to receive pin 144 the threaded bores 143 in the clamp ring will be aligned with the respective apertures 142 in flange 126.

As shown in FIG. 14, the apertures 142 are countersunk and bolts 141 are of the type adapted to develop a fluid-tight seal between the bolt head and the countersunk surface. Alternatively, if the apertures can not be provided with suitable countersunk sealing surfaces, flat bottom screw heads may be used with sealing washers.

A leak detection port 147 can be provided as also shown in FIG. 14.

While the pipe unions have been described to this point as being quite similar with respect to the flanged portions thereof, it will be understood that the exact dimensioning of the flange members including the number of bolts employed and sizes thereof will depend upon the pipe size and pressure rating.

In order to provide adequate clearance for the primary seal, it may sometimes be necessary to employ a larger bolt circle for the main bolts than that ordinarily specified.

While bolted flanges have been shown as the means for establishing the joints described herein, it will be understood by those skilled in the art that the invention can be applied to joints that are connected by split clamps or in other known fashion. The reinforcement 93 in FIG. 8 may be incorporated in any if the gap insensitive radially outer seals employing a plastic element, and the glass cloth may be replaced by other reinforcing materials such as wire mesh, other plastic fibers, cloth or braid or the like. Similarly the clamp rings in FIGS. 1 to 7 may be modified to include tabs such as tabs 87 and 88 in FIG. 8. The flange construction can also be varied with the invention being applicable to joints produced with screwed flanges, slip-on welding flanges, lapped flanges and the like.

Depending upon the choice of metal for the axially extensible element in the seals that are not gap sensitive it may be deemed preferable to avoid forming a flange at the end of the element, e.g., flange 138 in FIG. 13 or flanges 25 and 26 in FIG. 1. Instead, for the purpose of securing said end of the element to the associated clamp ring the end of the element may terminate within the inner diameter of the clamp ring and be welded to the latter to establish a fluid-tight seal and mechanical attachment. Sacrificed with welding, however, is the freedom to orient the clamp ring relative to the extensible element for facilitating alignment of bolt holes.

Belleville washers may be disposed under all of the bolt heads and nuts as an additional provision for compensating for cold flow of plastic parts.

As mentioned in the introduction, a pre-load dependent seal can be established by bringing directly together confronting surfaces of the union members. It should be understood, therefore, that a union of the type illustrated in FIG. 1, for example, can be modified by omitting the separate seal 17 and suitably modifying the raised faces 15 and 16 such that they can be brought together with sufficient pre-loading to develop a fluid-tight interfacial relationship. This might entail inclining the confronting surfaces such that they engage with a line contact rather than broad surface contact. In other respects the union would be the same as that illustrated in FIG. 1. Also, other gasket type or gap sensitive seals or their equivalents can be substituted for the specifically illustrated seals 17, 43 and 44.

Having described the presently preferred embodiments of the invention with reference to the appended drawings, it will be apparent that various changes in construction may be introduced without departing from the true spirit of the invention as defined in the appended claims.

What is claimed is:

1. A disconnectable pipe union comprising in combination first and second union members, means for establishing between said union members a first circumferential seal whose sealing effectiveness is a function of its pre-loading and which is fluid-tight when pre-loaded above a given level, means constructed and arranged to be placed under tension to draw said first and second union members toward each other to provide at least said given level of pre-loading for said first seal, said union members being related to said means for establishing a first seal such that at least corresponding portions of said union members radially outward of said first seal remain separated axially with at least a certain minimum gap therebetween when the union members are drawn together with said first seal established therebetween, axially extensible sealing means constructed and arranged to be separably fastened to both of said union members for establishing a second fluid-tight circumferential seal within said gap surrounding concentrically said first seal and operative independently of said pre-loading at least to contain any fluid leaking past said first seal due to diminution of said pre-loading below said given level anywhere circumferentially around said first seal, and means for establishing a separable reusable connection between said union members and the corresponding end of said axially extensible sealing means.

2. A disconnectable pipe union according to claim 1, wherein said axially extensible sealing means comprises a fluid impervious element having a central tubular portion extending between radially outwardly extending end flange portions with at least said tubular portion constructed and arranged for both contraction and extension axially relative to the axial dimension of said flat seal, and said means for establishing a separable connection between said union members and the corresponding end of said axially extensible sealing means comprises a separate substantially rigid clamp ring surrounding said tubular portion of the fluid impervious element adjacent each of said flange portions, and threaded members for securing each of said clamp rings to a different one of said union members with the corresponding flange portion of the fluid impervious element sandwiched therebetween.

3. A disconnectable pipe union according to claim 2, wherein said union members are in the form of pipe flanges and said clamp rings are each provided with a circumferential array of spaced threaded apertures whose axes are parallel to the longitudinal axis of the ring, said pipe flanges are provided with an array of apertures which register with the apertures in said rings when the latter are in place relative to said pipe flanges, and said threaded members comprise corresponding threaded bolts for disposition through the apertures in said pipe flanges into threaded engagement with the corresponding apertures in said clamp rings.

4. A disconnectable pipe union according to claim 3, wherein a plastic liner extends through each of said pipe flanges and is flared radially outwardly over the respective flange face to provide a respective integral gasket therefor, said integral gaskets constituting at least a part of said means for establishing a first seal.

5. A disconnectable pipe union according to claim 2, wherein said fluid impervious element comprises sintered polytetrafluoroethylene resin.

6. A disconnectable pipe union according to claim 5, wherein a layer of fabric reinforcement is disposed around at least said central tubular portion of said fluid impervious element to impart additional strength thereto for containing that fluid pressure which accompanies a leak past the first seal.

7. A disconnectable pipe union according to claim 2, wherein said central tubular portion of the fluid impervious element is formed with at least one circumferential corrugation and said clamp rings are each contoured along the respective surface which confronts said corrugation to conform generally to the configuration of said corrugation thereby backing up and accommodating the same.

8. A disconnectable pipe union according to claim 7, wherein said fluid impervious element comprises sintered polytetrafluoroethylene resin.

9. A disconnectable pipe union according to claim 1, wherein said union members are in the form of pipe flanges with a plastic liner extending through each said pipe flange and flared radially outwardly over the respective flange face to provide a respective integral gasket therefor, said integral gaskets constituting at least a part of said means for establishing a first seal.

10. A disconnectable pipe union comprising in combination first and second union members, an annular first seal for disposition between said union members, reusable means constructed and arranged to be placed under tension to draw said first and second union members toward each other for preloading said first seal therebetween, said union members being related to said first seal such that at least corresponding portions of said union members radially outward of said first seal remain separated axially with at least a certain minimum gap therebetween when the union members are drawn together with said first seal therebetween, and a second annular seal for disposition in said gap between said portions of said union members so as to surround concentrically said first seal, said second seal having opposite ends between which it is both contractible and extensible axially, and means for establishing a fluid-tight selectively separable connection between each of said first and second union members and the corresponding adjacent end of said second seal, said last mentioned means being operative independently of said reusable means, and said second seal being axially contractible to an extent sufficient to avoid interfering with the ability of said union members to be drawn together for developing fluid-tight interengagement with said first seal.

11. A disconnectable pipe union according to claim 10, wherein said second seal comprises a fluid impervious element having a central tubular portion extending between radially outwardly extending end flange portions with at least said tubular portion constructed and arranged for both contraction and extension axially relative to the axial dimension of said first seal, and said means for establishing a connection between said union members and the corresponding end of said second seal comprises a separate substantially rigid clamp ring surrounding said tubular portion of the second seal adjacent each of said flange portions, and threaded members for securing each of said clamp rings to a different one of said union members with the corresponding flange portion of the second seal sandwiched therebetween.

12. A disconnectable pipe union according to claim 11, wherein said union members are in the form of pipe flanges and said reusable means comprise a plurality of mating nuts and bolts for disposition in respective bolt holes in said pipe flanges.

13. A disconnectable pipe union according to claim 12, wherein said clamp rings are each provided with a circumferential array of spaced threaded apertures whose axes are parallel to the longitudinal axis of the ring, said pipe flanges are provided with an array of apertures which register with the apertures in said rings when the latter are in place relative to said pipe flanges, and said threaded members comprise corresponding threaded bolts for disposition through the apertures in said pipe flanges into threaded engagement with the corresponding apertures in said clamp rings.

14. A disconnectable pipe union according to claim 11, wherein said fluid impervious element comprises sintered polytetrafluoroethylene resin.

15. A disconnectable pipe union according to claim 14, wherein a layer of fabric reinforcement is disposed around at least said central tubular portion of said second seal to impart additional strength thereto for containing that fluid pressure which accompanies a leak past the first seal.

16. A disconnectable pipe union according to claim 11, wherein said central tubular portion is formed with at least one circumferential corrugation and said clamp rings are each contoured along the respective surface which confronts said corrugation to conform generally to the configuration of said corrugation thereby backing up and accommodating the same.

17. A disconnectable pipe union according to claim 16, wherein said fluid impervious element comprises sintered polytetrafluoroethylene resin.

18. A disconnectable pipe union comprising in combination first and second union members, means for establishing between said union members a first circumferential seal whose sealing effectiveness is a function of its pre-loading and which is fluid-tight when pre-loaded above a given level, means constructed and arranged to be placed under tension to draw said first and second union members toward each other to provide at least at the time the pipe union is assembled at least said given level of pre-loading for said first seal, said union members being related to said means for establishing a first seal such that confronting circumferential portions of said union members radially displaced from the region of said first seal remain separated axially with at least a certain minimum gap therebetween when the union members are drawn together with said first seal established therebetween, and axially extensible tubular sealing means constructed and arranged for establishing a second fluid-tight circumferential seal bridging said gap and operative independently of said pre-loading, said axially extensible sealing means having axially spaced ends, at least one radially oriented corrugation located intermediate said spaced ends, and a rotatably orientable clamp ring mounted on one of said spaced ends for separably fastening said one end to the corresponding one of said union members.

19. A disconnectable pipe union according to claim 18, wherein said union members are in the form of pipe flanges with a plastic liner extending through each said pipe flange and flared radially outwardly over the respective flange face to provide a respective integral gasket therefor, said integral gaskets constituting at least a part of said means for establishing a first seal.

20. A disconnectable pipe union according to claim 18, wherein said union members are in the form of pipe flanges and said clamp ring is provided with a circumferential array of spaced threaded apertures whose axes are parallel to the longitudinal axis of the ring, said pipe flange corresponding to said corresponding one of said union members is provided with an array of apertures which register with the apertures in said ring when the latter is in place relative to said pipe flanges, and threaded members in the form of threaded bolts for disposition through the apertures in said pipe flange into threaded engagement with the corresponding apertures in said clamp ring.

21. A disconnectable pipe union according to claim 18, wherein said axially extensible tubular sealing means is metallic, and the other of its spaced ends is permanently fastened and sealed to the corresponding other of said union members by means of a mechanical interlock and a weld for, respectively, resisting axial separation and providing a fluid-tight seal.

22. A disconnectable pipe union according to claim 21, wherein said union members are in the form of pipe flanges with a plastic liner extending through each said pipe flange and flared radially outwardly over the respective flange face to provide a respective integral gasket therefor, said integral gaskets constituting at least a part of said means for establishing a first seal.

23. A disconnectable pipe union according to claim 21, wherein said mechanical interlock comprises near said other of said spaced ends of said extensible tubular sealing means an annular portion thereof that is displaced into a groove in said other of said union members, and said weld is located closer to said other of said spaced ends than said annular portion.

24. A disconnectable pipe union according to claim 23, wherein said union members are in the form of pipe flanges with a plastic liner extending through each said pipe flange and flared radially outwardly over the respective flange face to provide a respective integral gasket therefor, said integral gaskets constituting at least a part of said means for establishing a first seal.

25. A disconnectable pipe union according to claim 21, wherein said corresponding one of said union members is in the form of a lap joint flange rotatably mounted on a lap joint stub end, said corresponding other of said union members is in the form of a welding neck flange with a raised face, said lap joint flange is provided with a plurality of circumferentially spaced bolt receiving apertures lying on a bolt circle, the lap end of said stub end extends radially outwardly to near the radially inner margin of said bolt circle, and said clamp ring is arranged to be separably fastened to said lap joint flange for establishing fluid-tight sealing engagement between said lap end and said one end of said tubular sealing means.

26. A disconnectable pipe union according to claim 25, wherein a first plastic liner extends through said lap joint stub end and is flared radially outwardly over a portion of said lap end to provide an integral gasket therefor, and a second plastic liner extends through said welding neck flange and is flared radially outwardly over said raised face to provide an integral gasket therefor, said integral gasket constituting at least a part of said means for establishing a first seal.

* * * * *